United States Patent [19]  [11] Patent Number: 4,899,240
McClure  [45] Date of Patent: Feb. 6, 1990

[54] BIASING FOR A UMR HEAD

[75] Inventor: Richard J. McClure, San Diego, Calif.

[73] Assignee: Eastman Kodak Company, Rochester, N.Y.

[21] Appl. No.: 225,416

[22] Filed: Jul. 28, 1988

[51] Int. Cl.$^4$ ............................................. G11B 5/39
[52] U.S. Cl. .................................................. 360/113
[58] Field of Search ......................................... 360/113

[56] References Cited

U.S. PATENT DOCUMENTS

| 3,881,190 | 4/1975 | Brock et al. | 360/113 |
| 4,052,748 | 10/1977 | Kuijk | 360/113 |
| 4,103,315 | 7/1978 | Hempstead et al. | 360/110 |
| 4,122,505 | 10/1978 | Kuijk | 360/113 |
| 4,141,051 | 2/1979 | Kuijk et al. | 360/113 |
| 4,142,218 | 2/1979 | Gorter | 360/113 |
| 4,191,977 | 3/1980 | Lewkowicz | 360/66 |
| 4,195,323 | 3/1980 | Lee | 360/113 |
| 4,321,641 | 3/1982 | Lee | 360/126 |
| 4,489,484 | 12/1984 | Lee | 29/603 |
| 4,535,375 | 8/1985 | Mowry et al. | 360/113 |
| 4,547,824 | 10/1985 | Best et al. | 360/113 |
| 4,556,925 | 12/1985 | Suenage et al. | 360/113 |
| 4,580,175 | 4/1986 | Mowry et al. | 360/113 |
| 4,660,113 | 4/1987 | Nomura et al. | 360/113 |

Primary Examiner—Robert S. Tupper
Attorney, Agent, or Firm—Robert F. Cody

[57] ABSTRACT

Both hard and easy axis bias fields are applied to the sense film of an unshielded magnetoresistive (UMR) magnetic head by a single bias source. The easy and hard axis fields are applied to the UMR sense film by so angling the applied bias field that orthogonal components of the field lie, respectively, in the directions of the easy and hard axes of the film.

10 Claims, 3 Drawing Sheets

BIASING FOR A UMR HEAD

BACKGROUND OF THE INVENTION

1. Field of the Invention

This invention relates to magnetoresistive (MR) heads for use in the playback of magnetically recorded signals. More particularly, the invention relates to MR heads of the unshielded type, often referred to as UMR heads, wherein an elongated thin film is brought into direct contact with a recording medium and, in response to signals recorded in the medium, signal current flowing the length of the film is caused to vary.

2. Description Relative to the Prior Art

In the interest of describing the state of the art, as well as the PROBLEM addressed by the invention, reference should first be had to the MR head of FIG. 1: A sense current i is passed through an MR sense film 10 via contacts 12, 14. In response to signal information magnetically recorded at A of a recording track 16, the resistance of the film varies to cause the current i to vary accordingly. As is fairly conventional, a magnetic layer 18, in proximity to the MR sense film 10, magnetically biases the magnetic moment M of the film 10: i.e., the sense current i sets up a magnetic field which, in traversing the layer 18, biases the ordinarily longitudinal moment to an orientation, as depicted.

To preclude a recorded signal field, say, at a track location B from corrupting the playback of signal information from the track location A, it is customary to shield (20, 22) the MR film 10.

FIG. 2 depicts schematically various typical domains which may be associated with the film 10 of FIG. 1. In response to a recorded signal field $M_s$, the domains will move, expand, and contract; and, as is known, such domain variations are manifested as signal noise, viz. Barkhausen noise.

The elimination of Barkhausen noise may be achieved, as indicated in FIG. 3, by significantly extending the length of an MR film 10', whereby only a single domain may intrinsically exist in the film 10'. This is a valid solution to the Barkhausen noise problem, but it is restricted, realistically, to head configurations wherein only a single record track 16' is read at any given time. This may be appreciated from a quick examination of FIG. 4 which shows schematically the difficulty of magnetoresistively reading simultaneously a number of closely spaced tracks $16a, b \ldots$, given that "long" MR sense elements $10a, b \ldots$ are employed.

U.S. Pat. No. 4,547,824 discusses another technique for ridding an MR sense film of a plurality of magnetic domains, viz. by applying an easy axis bias field along the longitudinal axis of the film, whereby domain walls are swept from the film. Thus, with but a single domain existing in the film, Barkhausen domain movement is intrinsically impossible. Such an easy axis bias field is complementary to a (second) hard axis field usually applied in the plane of the field perpendicular to the longitudinal axis of the film.

With a shielded MR head, the application of a field that is along the easy axis of its sense film is not a readily apparent and practicable thing to achieve. Because, however, of known signal processing techniques which dispose of problems associated with the undesired influence of "upstream" fields (B, FIG. 1) vis-a-vis of UMR head, the viability of a practical UMR has been recognized.

SUMMARY OF THE INVENTION

Pursuant to the invention, both hard and easy axis bias fields are applied to the sense film of a UMR magnetic head, such fields stemming from a single bias source. More particularly, the invention teaches that easy and hard axis fields may be applied to a UMR sense film by so angling the applied bias field that orthogonal components of the applied field lie, respectively, in the directions of the easy and hard axes of the film.

Several techniques are indicated below for implementing this technique.

The invention, as well as the prior art, will be described with reference to the figures, of which FIG. 1 is a diagram illustrating a prior art practice utilizing an MR playback head, FIG. 2 is a diagram useful in describing apparatus according to the invention, FIG. 3 is a perspective view of prior art apparatus providing a solution to a problem inherent in the structure of FIG. 1, FIG. 4 is a diagram useful in describing a problem inherent in the use of apparatus according to FIG. 3, FIG. 5 is a perspective showing of a presently preferred embodiment of the invention, FIG. 6a and FIG. 6b are schematic diagrams useful in illustrating another embodiment of the invention, and FIG. 7 is a perspective showing of yet another embodiment of the invention.

DETAILED DESCRIPTION

Figure 1:
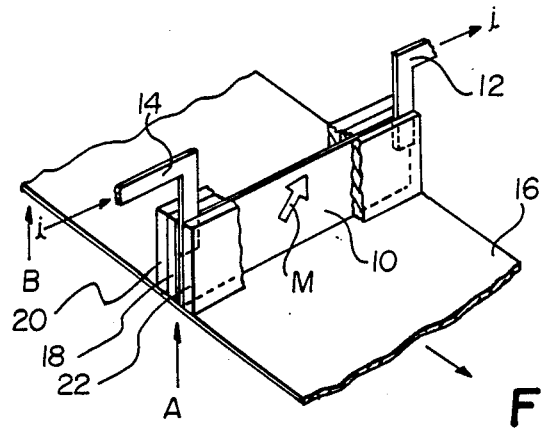
Figure 2:
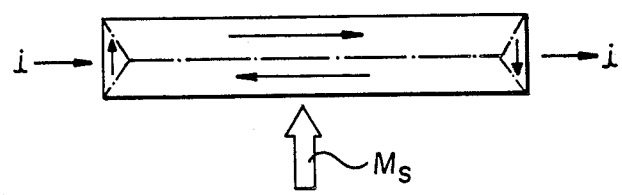
Figure 3:
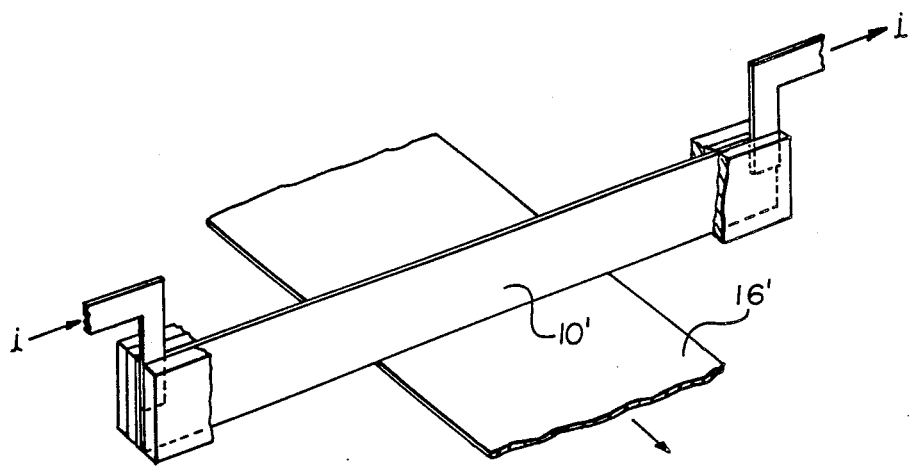
Figure 4:
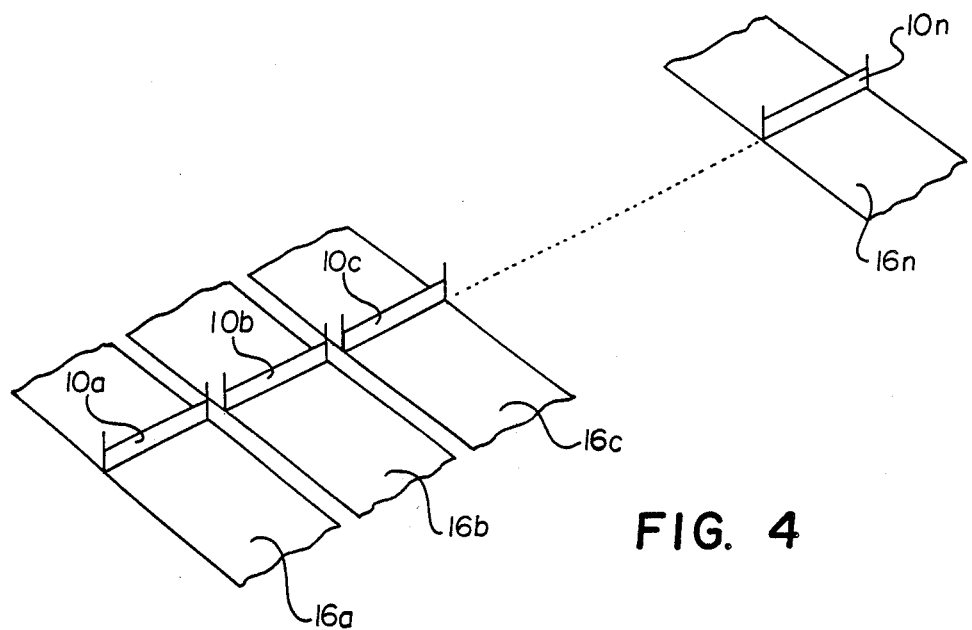
Figure 5:
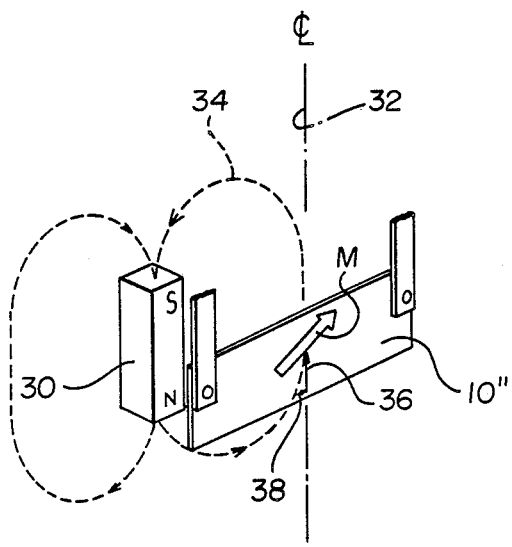

Referring, therefore, to FIG. 5, a UMR head is depicted as having a sense film 10" in cooperation with a bias magnet 30. The bias magnet 30 is so disposed relative to the film 10", off the center line 32 of the film, that a first part of the field 34 engages the film 10" in proximity to the film center line. Attendantly, the field 34 is comprised of two film biasing components, one component 36 applying hard axis bias to the moment M of the film 10", and the other 38 providing easy axis bias for sweeping noise-producing domains from the film 10".

Figure 6A:
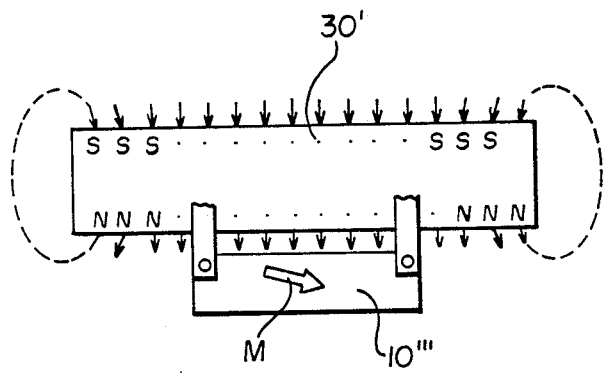
Figure 6B:
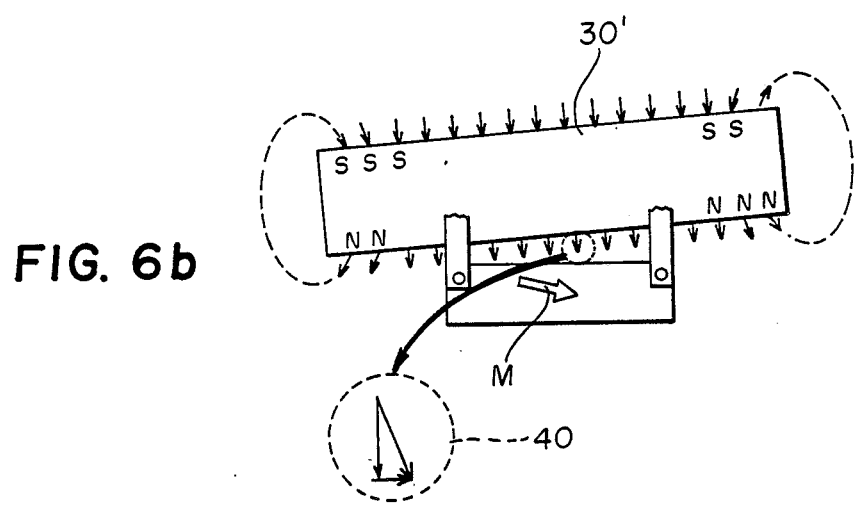

While the configuration of the invention depicted in FIG. 5 is a presently preferred implementation, the invention may also be practiced otherwise: Referring therefore to FIG. 6a, a prior art UMR head is indicated, conventionally, as having the moment M of the film 10''' subjected to a hard axis bias from a magnet 30'. To be noted is that the magnet 30' is longer than the film 10''', whereby a uniform bias field is applied to the hard axis of the film 10'''. By tilting the magnet 30' as shown in FIG. 6b, the uniform bias field associated with the magnet 30' is provided with orthogonal components, one bias component being along the easy axis of the film 10''', and the other component being along the hard axis of the film 10''' . . . as shown by the encircled vector diagram 40 of FIG. 6b. Thus, as was the case with the configuration of FIG. 5, both moment-biasing, as well as "Barkhausen" domain-sweeping, are achieved by a single bias source.

Figure 7:
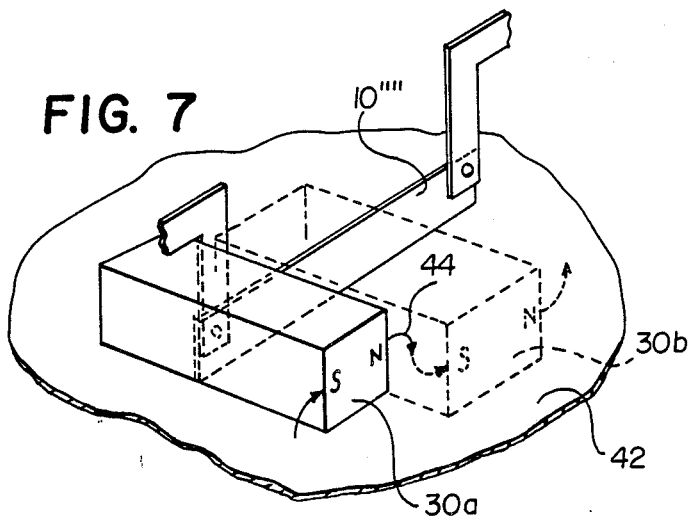

By "single bias source", as used herein, is meant a single magnetic structure the composite "exiting" field of which may be broken into two components, one oriented along the easy axis of a film and one oriented along the hard axis of such film. This point may be appreciated from an examination of FIG. 7: A single magnetic structure 30a (as a result of cooperation with a magnetic structure 30b that is disposed on the underside of a magnetic recording medium 42) has a composite "exiting" field 44 that has a pair of orthogonal components, one being a bias field along the easy axis of a sense film 10'''', and one being along the hard axis of the film.

The invention has been described in detail with particular reference to a presently preferred embodiment, but it will be understood that variations and modifications can be effected within the spirit and scope of the invention. For example, while all of the indicated embodiments depict the use of permanent magnets for biasing purposes, it is of course within the purview of the invention to employ electromagnetic biasing means as well.

What is claimed is:

1. A substantially unshielded magnetoresistive head comprising
    a. an elongated thin-film structure having an easy axis of magnetization that is generally along the length of said film, and having a hard axis of magnetization that is generally in the plane of and perpendicular to the easy axis of the film, and
    b. single magnetic means in proximity to said film and having a composite field exiting therefrom which has first and second field components cooperative with said film, said first field component being in the direction of the easy axis of said film, and said second component being in the direction of the head axis of said film.

2. The apparatus of claim 1 wherein said single magnetic means is disposed off the center line of said thin film, thereby to provide a composite field having easy and hard axis biasing components.

3. The apparatus of claim 2 wherein said single magnetic means is so disposed that its exiting field is generally perpendicular to the information reading edge of said film.

4. The apparatus of claim 2 wherein said single magnetic means is so disposed that its exiting field is generally parallel to the information reading edge of said film.

5. The apparatus of claim 1 wherein said single magnetic means is a magnet lying generally the length of said film, closer to said film at one end thereof than at the other.

6. An unshielded magnetoresistive head comprising
    a. an elongated magnetoresistive film having an edge that is generally parallel to the easy magnetization axis of said film and adapted to cooperate with a recording medium to read information recorded in said film, and
    b. single magnetic means having a field exiting therefrom that has first and second components in the plane of said film, a first component being parallel to said information reading edge thereof, and the second component being perpendicular to said first component.

7. The apparatus of claim 6 wherein said single magnetic means is disposed off the center line of said thin film, thereby to provide a composite field having easy and hard axis biasing components.

8. The apparatus of claim 7 wherein said single magnetic means is so disposed that its exiting field is generally perpendicular to the information reading edge of said film.

9. The apparatus of claim 7 wherein said single magnetic means is so disposed that its exiting field is generally parallel to the information reading edge of said film.

10. The apparatus of claim 6 wherein said single magnetic means is a magnet lying generally the length of said film, but closer to said film at one end thereof than at the other.

* * * * *